(12) United States Patent
Nassehi

(10) Patent No.: US 6,889,218 B1
(45) Date of Patent: May 3, 2005

(54) ANOMALY DETECTION METHOD

(75) Inventor: Mehdi Nassehi, Horgen (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/571,137

(22) Filed: May 15, 2000

(30) Foreign Application Priority Data

May 17, 1999 (EP) .......................... 99109691

(51) Int. Cl.⁷ .......................................... G06F 15/18
(52) U.S. Cl. ............................ 706/45; 706/46; 706/47
(58) Field of Search ................... 706/47, 48; 707/6; 714/2, 38

(56) References Cited

U.S. PATENT DOCUMENTS

| | | | |
|---|---|---|---|
| 5,440,723 A | * 8/1995 | Arnold et al. | 714/2 |
| 5,699,507 A | * 12/1997 | Goodnow et al. | 714/38 |
| 5,953,006 A | * 9/1999 | Baker et al. | 345/700 |
| 6,401,088 B1 | * 6/2002 | Jagadish et al. | 707/6 |

FOREIGN PATENT DOCUMENTS

WO   WO 9215954 A1 * 9/1992   ........... G06F/15/40

OTHER PUBLICATIONS

McCreight, E., A Space–Economical Suffix Tree Construction Algorithm, Apr. 1976, ACM Press, vol. 23 Issue 2, p. 262–72.*

Rodeh, M. et al, Linear Algorithm for Data Compression via String Matching, Jan. 1981, ACM Press, vol. 28 Issue 1, p. 16–24.*

Wojciech, S., (Un)expected Behavior of Typical Suffix Trees, 1992, Society for Industrial and Applied Mathematics, p. 422–431.*

Teng et al., Security Audit Trail Analysis Using Inductively Generated Predictive Rules, 1990, IEEE Journal, p. 24.*

Apostolic A. et al., Structural Properties of the String Statistics Problem, Journal of Computer and Systems Sciences, vol. 31 No. 2, p. 394–411.*

Chen, K., An Inductive Engine for the Acquisition of Temporal Knowledge, Ph. D. Thesis, Dept. of CS at Univ. of Illinois at Urbana–Champaign, 1988.*

Vaccaro, H.S. and Liepins, G.E., Detection of Anomalous Computer Session Activity, 1989, IEEE Symp. On Res. in Sec. & Privacy, p. 280–89.*

Aho, A.V. and Corasick, M.J., Efficient String Matching: an aid to Bibliographic Search, Jun. 1975, Communications of the ACM, vol. 18 No. 6, p. 333–40.*

* cited by examiner

*Primary Examiner*—Anthony Knight
*Assistant Examiner*—Michael B. Holmes
(74) *Attorney, Agent, or Firm*—Scully, Scott, Murphy & Presser; Louis P. Herzberg (57) ABSTRACT

A computerized method, encoded on a computer-readable medium, of detecting anomalies in an event stream. The method comprises at least two acts. In a first act, the method uses a tree structure to extract a grammar having an associated set of rules, from a sample of normal behavior. In a second act, the method checks an event stream against the rules of the grammar to detect anomalies.

8 Claims, 11 Drawing Sheets

ANOMALY DETECTION METHOD

BACKGROUND OF THE INVENTION

This invention relates to a method of detecting errors, and in particular, to a method of detecting anomalies in an event stream such as in data reception on a modem or in detection of possible intruders in a secure network.

In the transmission of large amounts of data via modem or within a network of computers, methods have been used to determine whether or not the transmission is proceeding successfully. If such methods detect that a stream of data is likely to have errors, then a warning is sent to alert the user such as a system administrator so that he can decide whether or not to terminate the transmission and correct the problem giving rise to the errors.

In addition, in security audit trail analysis, data or activities within a secure system are analyzed in order to uncover anomalies which may warrant further investigation in order to determine whether the security of the network is being compromised. One approach, described in *Security Audit Trail Analysis Using Inductively Generated Predictive Rules*, by Teng et al., IEEE Journal, p. 24, 1990, uses patterns as a profile for anomaly detection in order to allow a security auditing system to capture characteristics of user behavior which may be erratic from a statistical point of view, using traditional statistical approaches. When these methods detect a possible intrusion into a network, a warning is sent to alert a system administrator.

Both of these applications, as well as many others, benefit from the application of general methods of detecting anomalies. As described in *Structural properties of the String Statistics Problem*, by A. Apostolic et al, Journal of Computer and Systems Sciences, vol. 31, no. 2, p. 394–411 and in *An Inductive Engine for the Acquisition of Temporal Knowledge, Ph. D. Thesis*, by K. Chen; Dept. Of Comp. Sci. at University of Illinois at Urbana-Champaign, 1988, rules have been used for anomaly detection. Further, there exists a high-level programming language, namely Prolog, which is used to invoke rules. In addition, as described in *Detection of Anomalous Computer Session Activity*, by H. S. Vaccaro and G. E. Liepins, Proc. IEEE Symp. On Res. in Sec. & Privacy, pp. 280–89, Oakland, 1989, trees have been used for anomaly detection, but only for consistency with a single audit record, not across a sequence of records. Still further, according to *Efficient String Matching: an aid to Bibliographic Search*, by A. V. Aho and M. J. Corasick, Communications of the ACM, vol. 18, no. 6, pp. 333–40, June 1975, Automatons have been used for string searching.

The above methods provides inputs which are useful in anomaly detection. However, they do not provide for fully integrated anomaly detection.

Therefore, what is needed is a fully integrated method based on simpler structures which will permit an analyst to go much farther in detecting anomalies representative of system security breaches.

SUMMARY OF THE INVENTION

It is therefore an object of the invention to provide a computerized method, encoded on a computer-readable medium, of detecting anomalies in an event stream. The method comprises two submethods. In a first submethod, the method uses a tree structure comprising a suffix tree and suffixes to extract a grammar (a set of rules) from a sample of normal behavior. In a second submethod, the method checks the event stream against the rules of the grammar to detect deviations.

In another feature of the invention, suffixes are truncated before being inserted in the suffix tree to further simplify processing.

In another feature of the invention, the method uses a rule-matching automaton is used to detect anomalies.

In another feature of the invention, the rule-matching automaton is used to take a second pass over the sample in order to reduce the set of rules, thus simplifying processing in further processing.

In another feature of the invention, the method includes the act of repetition-compaction which identifies and compacts repetitions of event sequences in the rules.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings.

DETAILED DESCRIPTION OF THE INVENTION

Figure 1A:
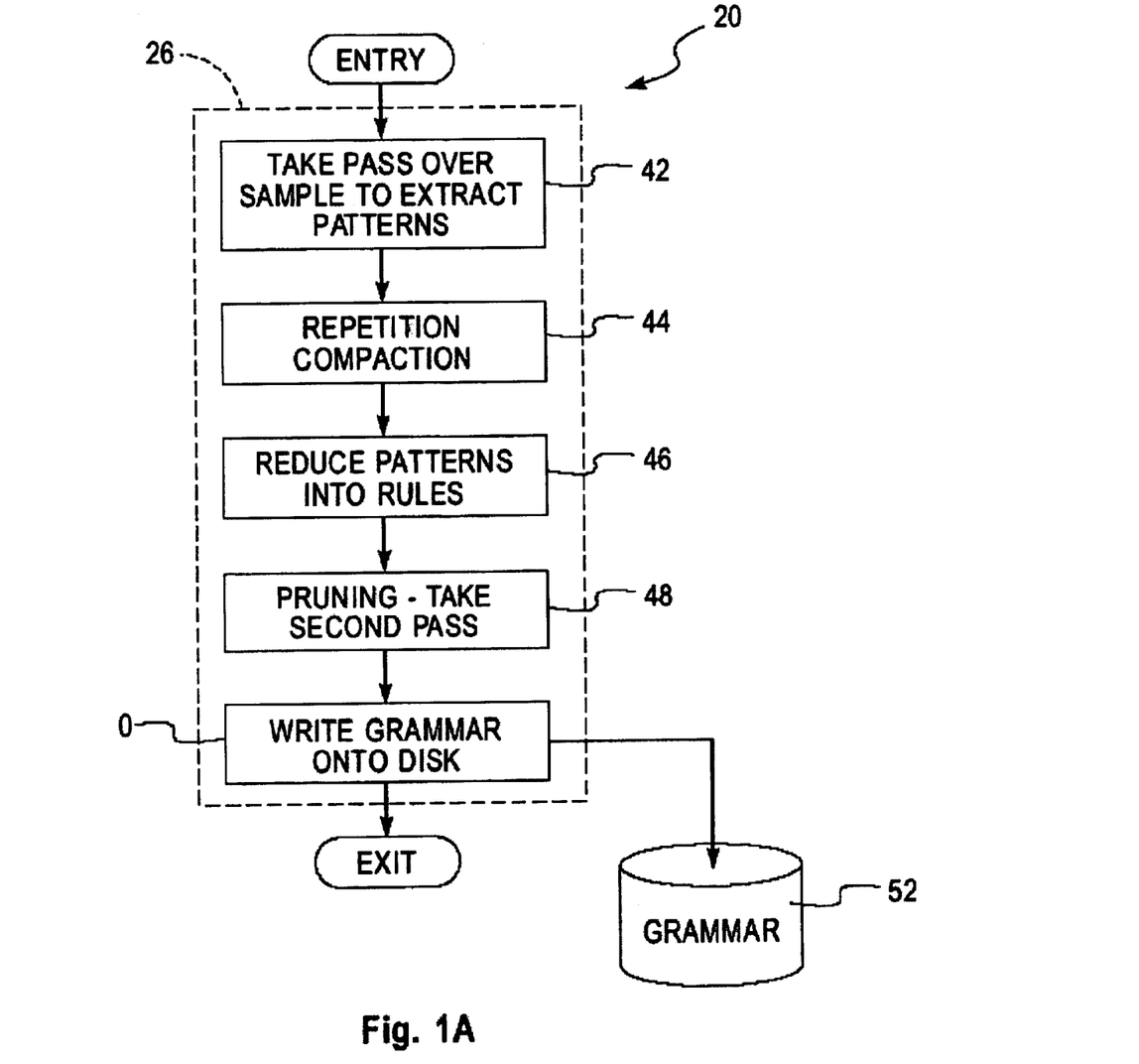
FIG. 1a is a block diagram of the grammar-extraction submethod of the invention.
Figure 1B:
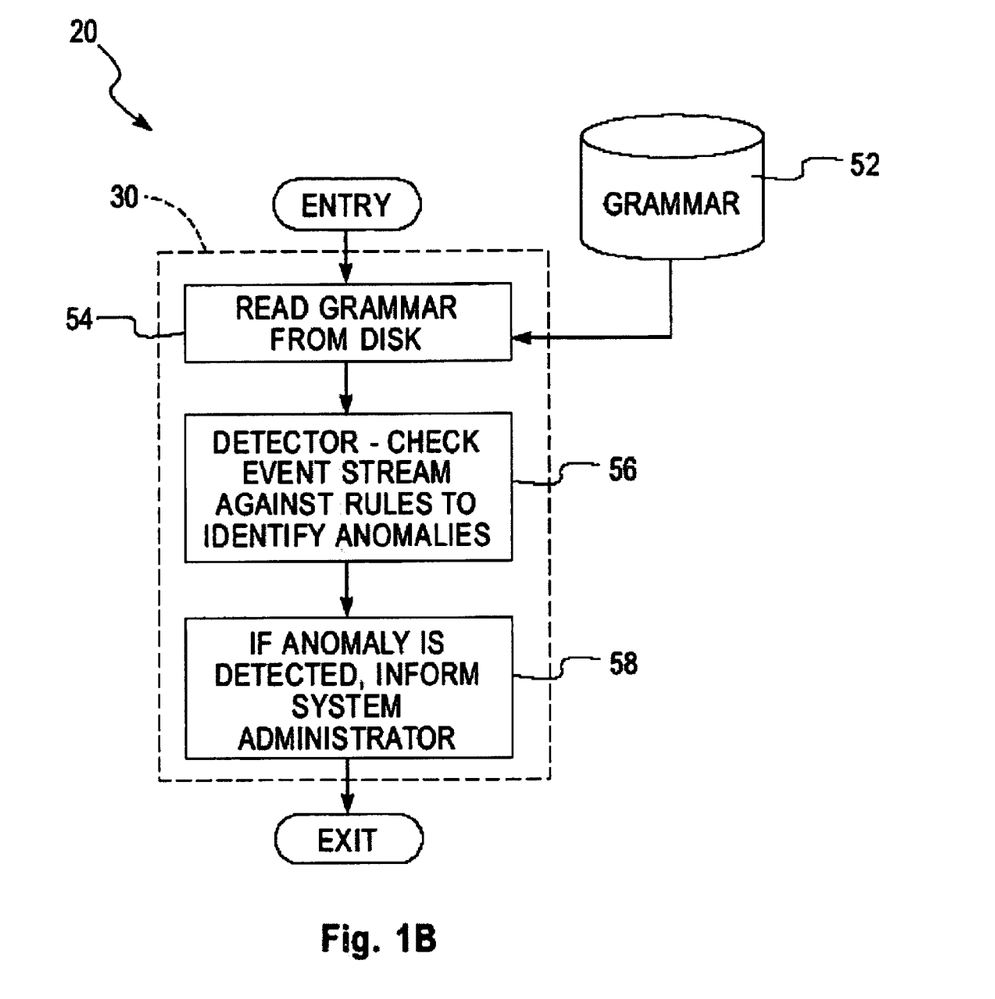
FIG. 1b is a block diagram of the anomaly detection submethod of the invention.
Figure 6:
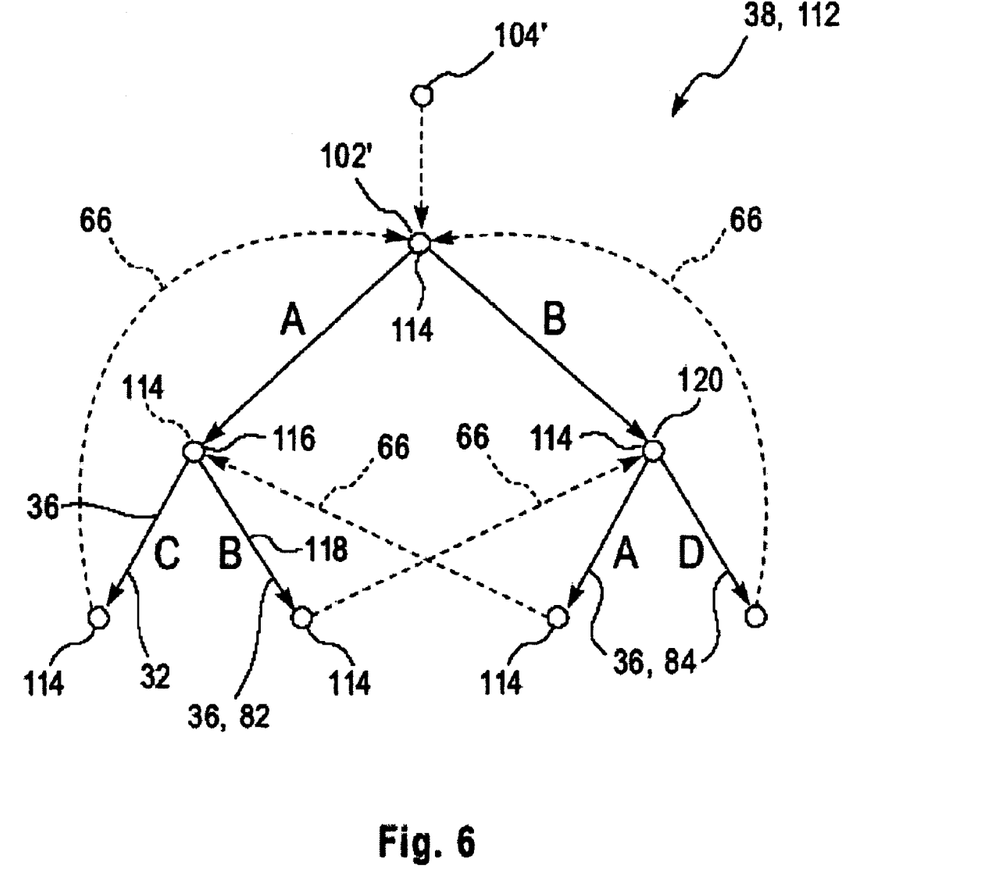
FIG. 6 is a schematic representation of a grammar produced by the method of the invention.

Referring now to FIGS. 1a and 1b, the invention is a computerized method 20, encoded on a computer-readable medium, of detecting anomalies 22 (shown in FIG. 2b) in an event stream 24 (shown in FIG. 2b) using a behavioral approach. The method 20 comprises two submethods 26 and 30. In a first submethod 26, in which grammar-extraction is carried out off-line, the method 20 uses a tree structure 32 (shown in FIG. 3) comprising a suffix tree 34 and suffixes 36 (shown in FIG. 2b) to extract a grammar 38 (e.g., as depicted in FIG. 6), i.e., a set of rules, from a sample 40 of normal behavior (shown in FIG. 2a). In a second submethod 30, carried out on-line, the method 20 detects anomalies by loading the grammar 38 and checking the event stream 24 against the rules of the grammar to detect anomalies 22.

In a preferred embodiment, the grammar-extraction submethod 26 includes five acts. In a first act 42, the method 20 takes a pass over the sample 40 to extract patterns. In a second, optional act 44, repetition-compaction is performed. In a third act 46, the method 20 reduces the patterns into rules. In a fourth, optional act 48, the method 20 prunes the rules of any which are extraneous or unnecessary. This is accomplished through the use of a rule-matching automaton 47 (shown in FIG. 7) which takes a second pass over the sample 40 in order to reduce the set of rules or grammar 38. This will be discussed in more detail below in connection with FIG. 1c. In a fifth act 50, the resulting grammar 38 is written to a disk 52 for use in the anomaly detection submethod 30. Referring now to FIG. 1b, the anomaly detection submethod 30 includes three acts. In a first act 54, at initialization, the grammar 38 is read from non-volatile memory on, for example, the disk 52 and then is loaded into a detector, for processing in a second act 56. In this second act 56, the submethod 30 checks the event stream 24 against the rules of the grammar 38 to detect anomalies 22 (shown in FIG. 2b). In a third act 58, the submethod 30 informs a system administrator of the anomalies 22.

Figure 1C:
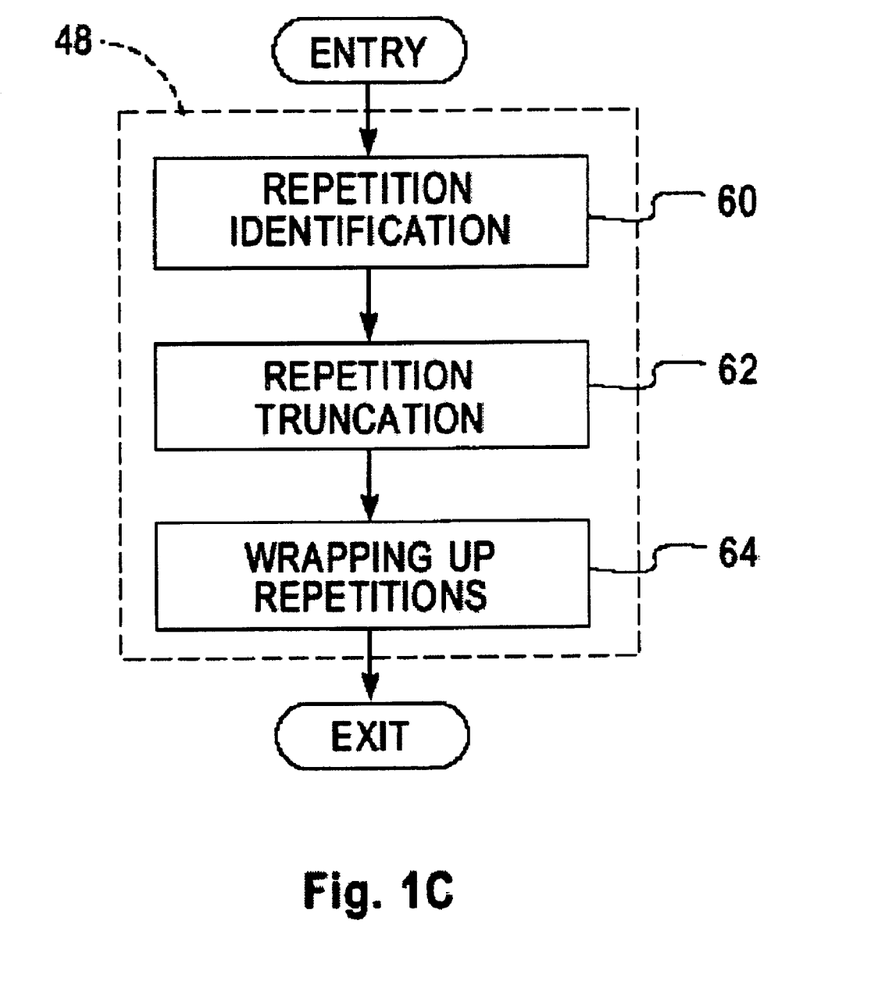
FIG. 1c is a block diagram of the repetition-compaction act of the invention.
Figure 3:
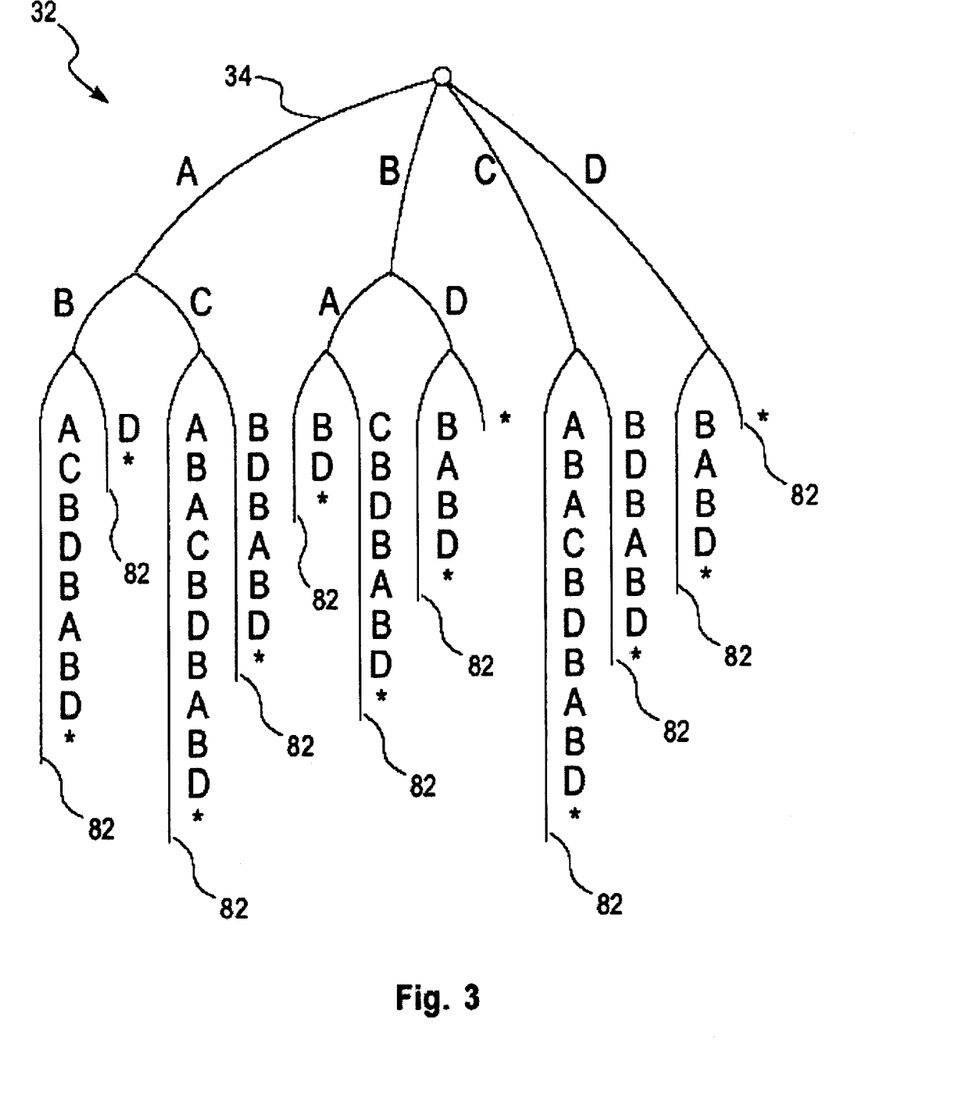
FIG. 3 is a schematic representation of a suffix tree used in the method of the invention.
Figure 9:
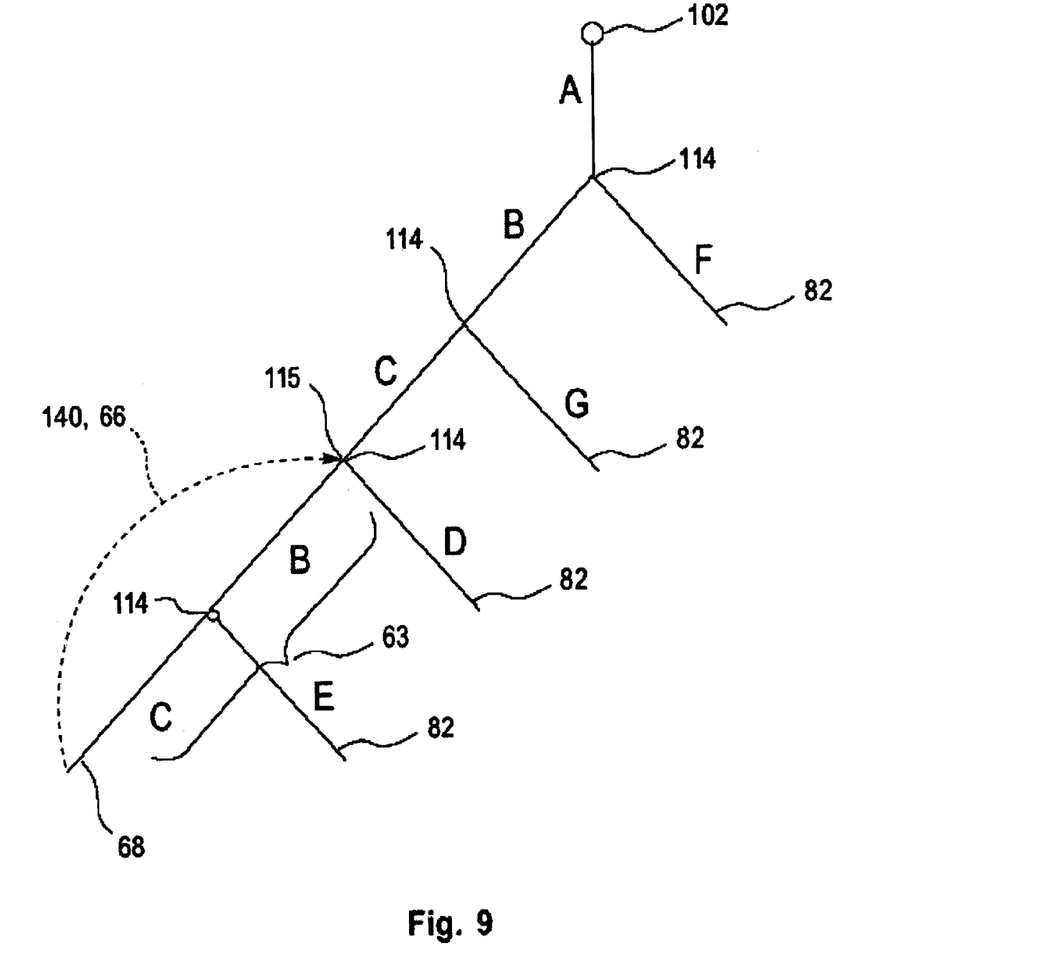
FIG. 9 is a schematic representation of a repetition compaction tree of the method of the invention.

Referring now to FIGS. 1c and 3, the second, optional act 44 of the first submethod 26, repetition-compaction, is shown in more detail. Repetition compaction 44 involves the truncation of suffixes 36 before being inserted in the suffix tree 34. This optional act 44 includes three actions. In a first action 60, a method such as the method proposed by Apostolic et al, is applied to identify the repetitions. In a second action 62, the repetitions are truncated down to only two occurrences. For example, as shown in FIG. 9, the left most branch after the second occurrence 63 of BC has been truncated. The third action 64 wraps up repetitions by inserting a shift link 66 from the end of a branch segment 68 corresponding to the second occurrence to its start 115.

Figure 2A:
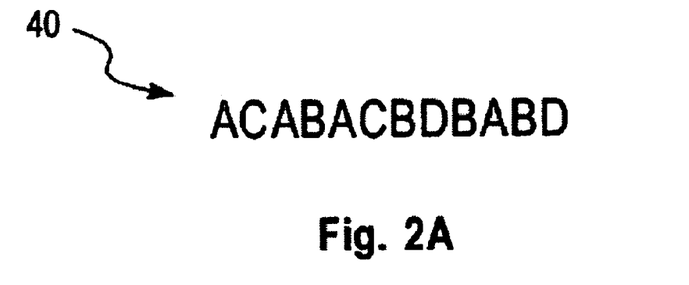
FIG. 2a is a sample of normal behavior which is analyzed by the method of the invention.

Referring to FIG. 2a, the sample 40 of normal behavior is shown in which BC and AA subsequences are anomalies 22 (shown in FIG. 2b) which do not occur.

Figure 2B:
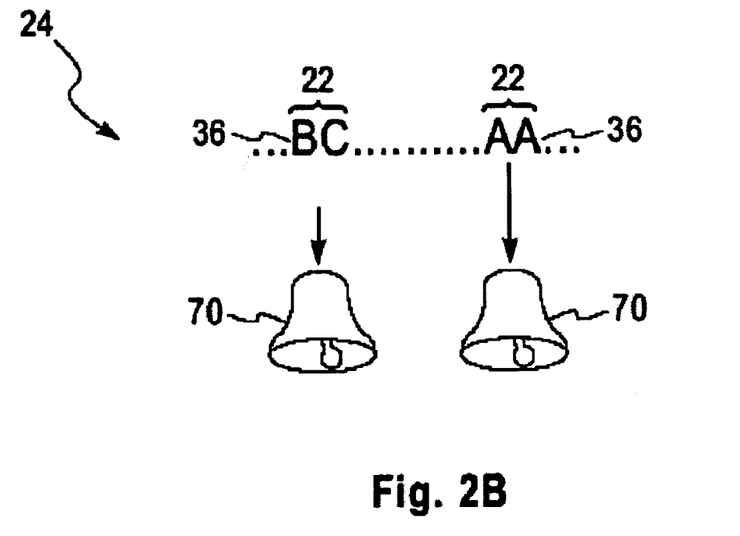
FIG. 2b is a sample event stream in which anomalies are identified by the method of the invention.

Referring to FIG. 2b, an event stream 24 is shown which includes events BC and AA. The detection of these anomalies 22 results in alarms 70 as the event stream 24 is processed.

Referring again to FIG. 1a, as indicated above, the grammar-extraction submethod 26 consists of the at least two acts 42 and 44, the extraction of patterns from the sample 40 of normal behavior and the reduction of the patterns into rules. A pattern is defined as any sequence of events which occurs more than once and is thus of significance. The extraction of patterns is based on a well-known suffix-tree approach. Consider the following sample 40 of the normal behavior and its corresponding suffix tree 34 shown in FIG. 3:

ACABACBDBABD*

The "*" sign acts as the end delimiter symbol. The suffix tree 34 is generated by starting from an empty tree and inserting all the suffixes 36 of the normal behavior into the tree.

Figure 4:
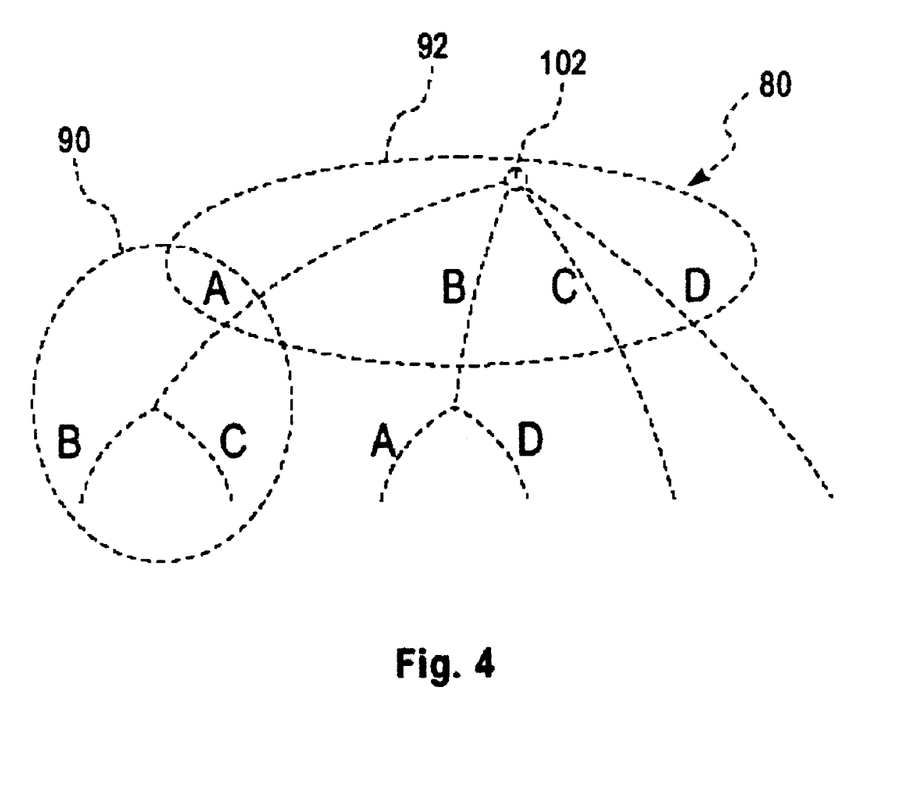
FIG. 4 is a schematic representation of a pattern tree developed from the sample of normal behavior.

Referring now to FIG. 4, a pattern tree 80 is generated from the suffix tree 34 based on the following observation. A leaf link 82 (shown in FIG. 3) is defined as a link that does not lead to any other link, which also means that it ends in the delimiter symbol "*". If the last event of an event subsequence (such as the event stream 24) is on a leaf link 82, that subsequence has occurred only once because it corresponds to a unique suffix with a specific start event. Otherwise, the subsequence has occurred more than once. Therefore, removing the leaf links 82 results in the pattern tree 80. Here {A, B, C, D, AB, AC, BA, BD} is the set of patterns.

The pattern tree 80 must be pruned to generate the most restrictive set of rules implied by the sample 40 of normal behavior. This is accomplished in act 46 of submethod 26 by taking a second pass over the sample 40. For example, the pattern tree 80 contains rule 90 that A is always followed by B or C, which is true. However, it also contains rule 92 that A, B, C and D can follow any event, which in the case of C and D is not true. Extraneous rules such as rule 92 are removed by applying the rule-matching automaton 47 (shown in FIG. 7) to the sample 40 of normal behavior.

The solid arrows 100 and 100a–100d correspond to the pattern tree 80. At initialization, the automaton 47 enters the state depicted by root 102. If the first event is A, B, C or D, the transition depicted by the corresponding arrow 100a, 100b, 100c, and 100d is taken. Otherwise, the event is an exception and the automaton 47 enters the reset node 104 and immediately jumps to the root 102. If the first two events are A and C, the automaton 47 takes the corresponding transitions and returns to the root 102. If the first two events are A and B, the automaton 47 takes the corresponding transitions, but does not return to the root 102 because B is the left-hand side of another rule 80, namely, it should be followed by A or D. The dashed arrows are referred to as shift links 66 and are taken immediately, without waiting for an event.

Figure 5:
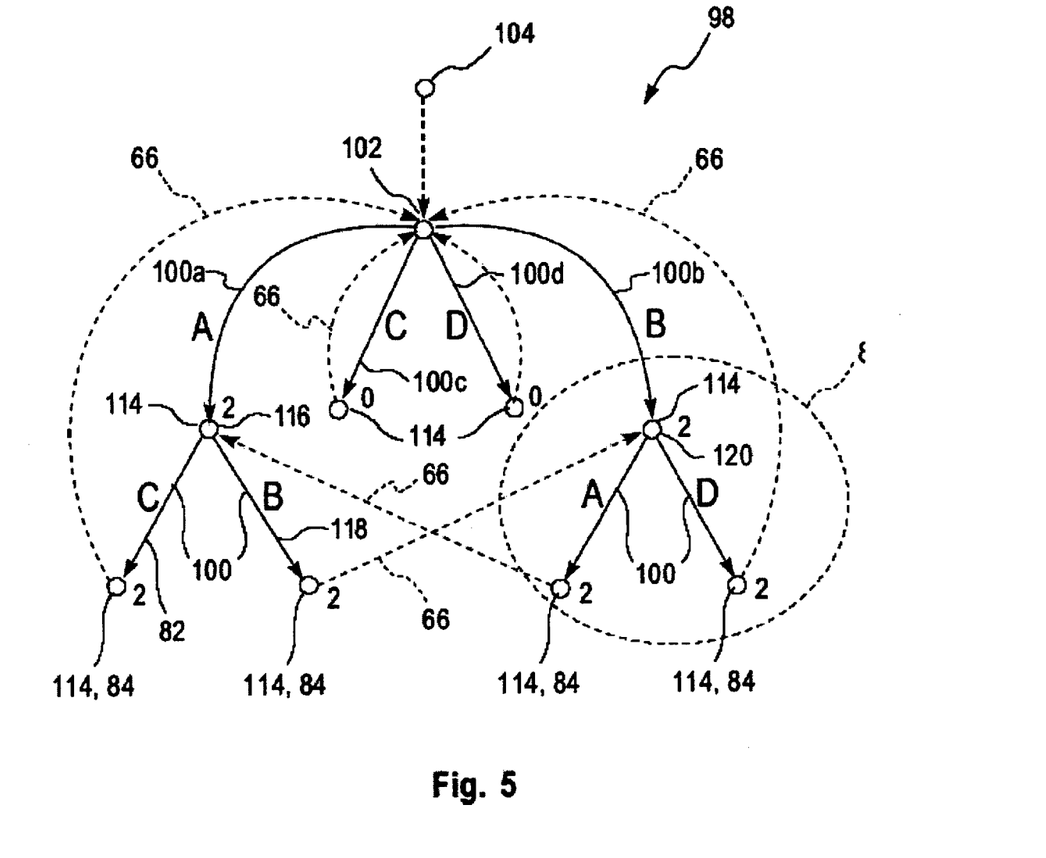
FIG. 5 is a schematic representation of an auxiliary grammar produced in the method of the invention.

Referring now to FIG. 5, the state graph of the rule-matching automaton 47 is referred to as the auxiliary grammar 98 of the normal behavior. The construction of the auxiliary grammar 98 from the pattern tree 80 is illustrated by the example shown in the figure. Consider the subsequence AB. This subsequence has a proper suffix 36, namely B, which corresponds to an internal node 114, specially internal node 98 of the rule tree 112. Thus a shift link 66 is placed from AB leaf link 118 to B node 120. In the case of subsequence AC, C, its only suffix, is a leaf link 82, not an internal node 114. Therefore, a shift link 66 is placed from AC to the root 102. In general, a shift link 66 is placed from each leaf 84 to the internal node 114 which corresponds to the longest proper suffix 36 of the subsequence corresponding to the leaf.

The rule-matching automaton 47 is applied to the original sample 40 of the normal behavior to reduce the pattern tree 80 to the rule tree 112. At each node 114 of the auxiliary grammar 98, a count is kept as to how many times that node is visited, as in the example of FIG. 5. The nodes 114 which have a count of zero corresponds to rules which are never triggered and can thus be removed. Their removal leads to the rule tree 112 and grammar 38 shown in FIG. 6. Note that the rule tree 112 may be pruned based on the statistical confidence of the rules. The more often a rule is invoked in the sample 40 of the normal behavior, the more confidence we may have in that rule. The nodes 114 associated with a number of invocations less than a certain threshold amount may be removed.

In an alternate embodiment of the invention, the rule-matching automaton 47 is used to perform the pruning act 46 (shown in FIG. 1a). The automaton 47 prunes a characterization table, rather than a tree structure 32. As with probably all other anomaly detection methods, the method 20 consists of both a characterization submethod and a detection submethod. In this alternate method of the invention, the characterization submethod consists of grammar extraction 26 which generates a table (not shown) of normal behavior. Thus, the detection submethod 30' can use this table in a second pass over the sample 40 of normal behavior. Table entries which are not used may be removed. Thus, the act of pruning 46 and thus the method 20, can be applied to any anomaly detection method.

Figure 8:
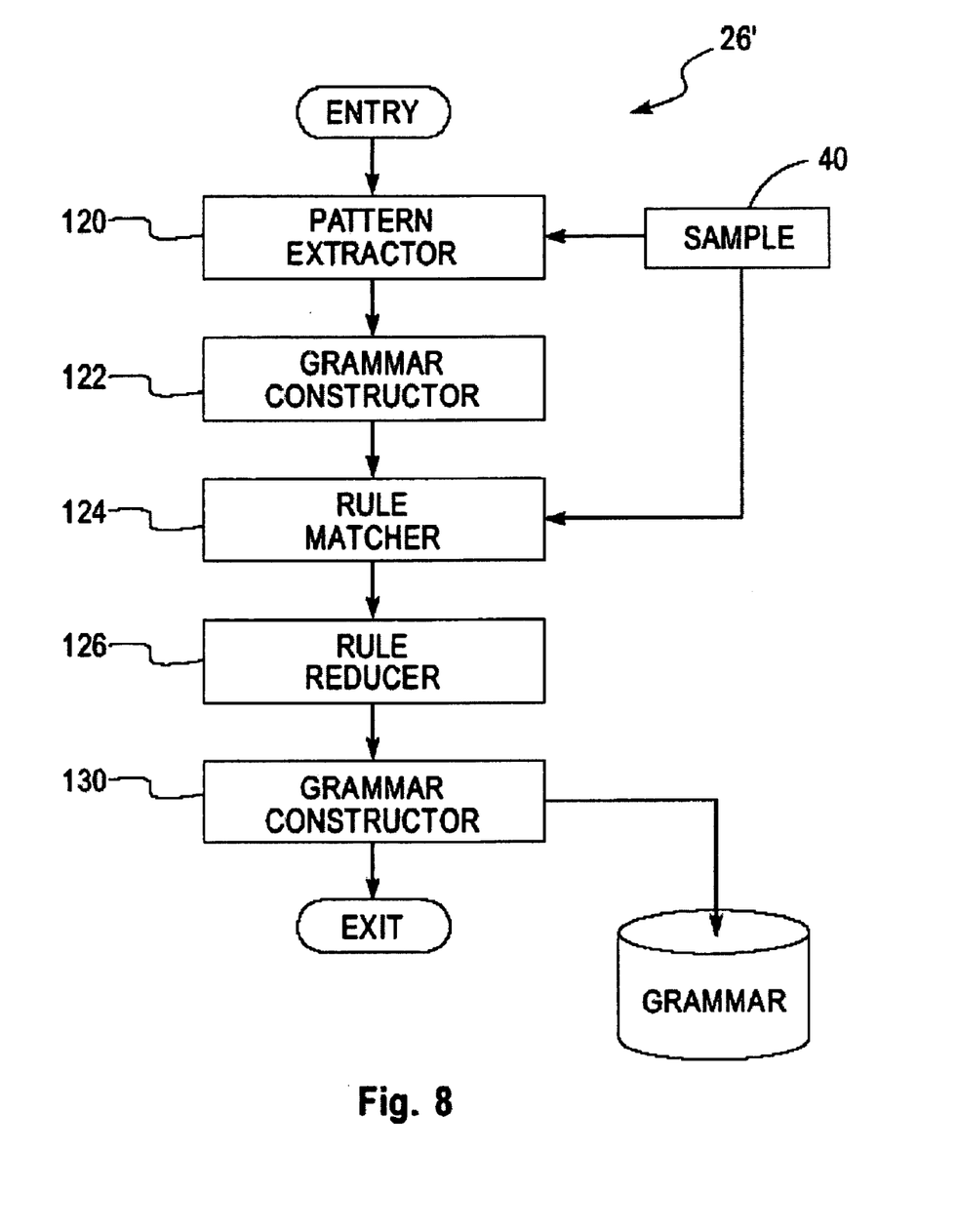
FIG. 8 is a more detailed block diagram of the grammar-extraction submethod of the invention.

Referring now to FIG. 8, a block diagram of an alternate embodiment of the grammar extraction submethod 26' is shown. The submethod 26' includes five subacts 120, 122, 124, 126, and 130. In the first subact 120, a pattern is extracted from the sample 40 of normal behavior, the output being the pattern tree 80. In the second subact 122, an auxiliary grammar 98 is constructed from the pattern tree 80. In the third subact 124, the rule-matching automaton 47 takes a second pass over the sample 40 of normal behavior, resulting in a tally of the frequency of rule invocations. In the fourth subact 126, the rules are reduced to a rule tree 112. In the fifth subact 130, a final grammar 38 is constructed. If the tally of a particular node is below a certain minimum amount, the rule may optionally be removed.

Figure 7:
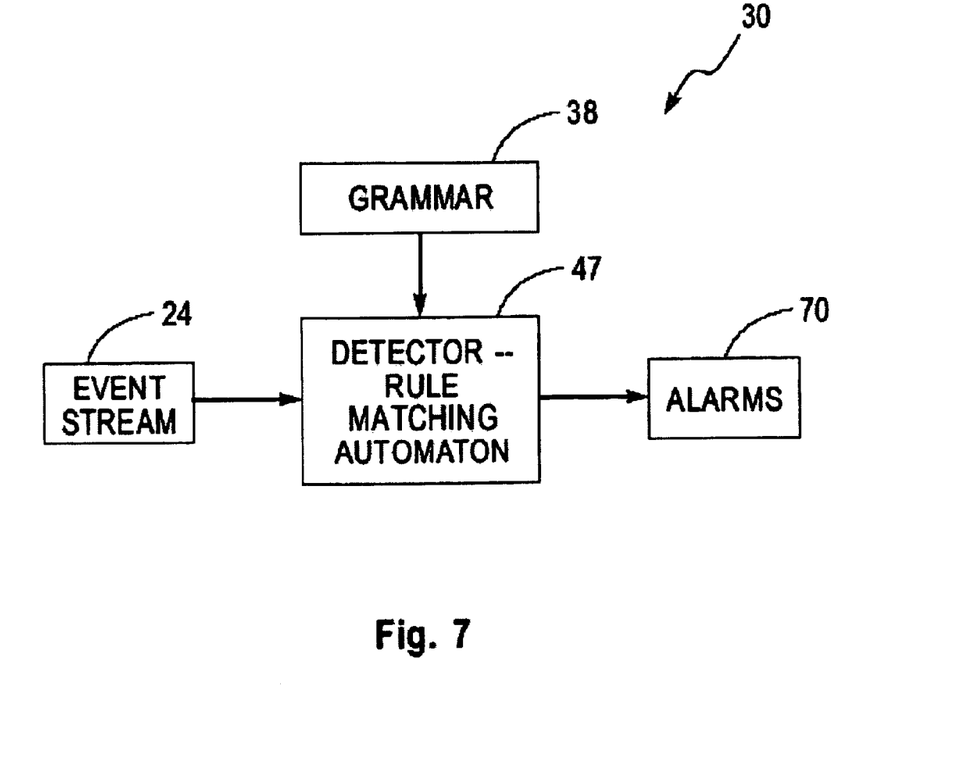
FIG. 7 is a more detailed block diagram of the anomaly detector of the method of the invention.

Referring now to FIGS. 6 and 7, a block diagram of anomaly detecting method 20 using the rule-matching automaton 47 for detection of anomalies 22 is shown. At initialization, the grammar 38 is loaded into the rule-matching automaton 47. The events in the event stream 24 are consumed one at a time by the rule-matching automaton 47. For every event which is an exception, the automaton 47 jumps to the reset node 104 and then to the root 102, generating the alarm 70.

Referring again to FIG. 1c, the repetition-compaction submethod 44, described above, identifies and compacts repetitions of event sequences in the rules. Consider now the following event streams:

ABCBCBCD;

ABCBCBE;

AF;

ABG.

The first two contain repetitions of BC and thus can be characterized in an abbreviated form as follows:

A[BC]D;

A[BC]BE.

These repetitions indicate that, although certain patterns, such as ABCD and ABCBCBCBCE, may not have occurred in the sample of normal behavior, they are probably normal. If desired, the repetition-compaction submethod 44 may be used to extend the grammar 38 in order to allow for any length of repetitions in the patterns.

If a system administrator, for example, indicates that the repetition-compaction submethod 44 should be applied, the first step of grammar extraction 26 is, as before, the act 42, the extraction of patterns, but there is a preprocessing before the auxiliary grammar 98 is constructed. More specifically, a method such as the one proposed by Apostolic et al. is used to identify the repetitions. As shown above, the compactions of these repetitions are denoted by brackets. In order to construct the auxiliary grammar 98, all the patterns are inserted into an empty tree, those having repetitions being treated in a special way. Consider the pattern A[BC]D, for example. For this pattern, ABCBCD is inserted in the tree and a repetition link 140 is put around the second BC. When all the patterns are added into the tree, shift links 66 are added to complete the grammar 38. In order to decide whether a shift link 66 fits between a leaf 82 and an internal node 114, a repetition link 142 may be traversed as many times as to make a match possible. The reduction of rule tree 112 and construction of grammar 38 proceeds as before.

The suffix tree 34 of the sample 40 of normal behavior can be obtained significantly faster, if an upper limit is imposed on the length of the patterns of interest. Then instead of each complete suffix 36, only the prefix of this suffix not exceeding the maximum pattern length is inserted in the tree 34. When the compaction 44 of the repetitions (i.e., repeated substrings) is desired, the suffix tree 34 is created in a two-pass process, as follows. First, the maximum pattern length used would be equal to the sum of the maximum preamble (which is the portion of the event stream 24 which precedes a repetition) and two times the maximum length of the repetition. Next, after the suffix tree 34 under this maximum pattern length is created, the auxiliary grammar 98 is constructed. Now, the auxiliary grammar 98 is used to filter the sample 40 of normal behavior such that there are no more than two consecutive repetitions. By increasing the size of the maximum pattern length by the maximum size of the trailer of pattern with repetitions, this filtered sample can be used to generate a second auxiliary grammar which includes the trailers as well.

An advantage of the system is that it offers a fully-integrated anomaly detection approach which significantly simplifies anomaly detection in computer networks, thus improving the security within the network.

INDUSTRIAL APPLICABILITY

The method 20 of the invention detects errors in data streams such as that which occurs in a computer, through a modem or in a computer network or in network systems caused by an intrusion attempt. The alarms 70 which result from the detection of these errors or anomalies 22 permit a user or system administrator to take corrective action, thus insuring security or saving time and system resources. More efficient data communications or a more secure network is therefore made possible.

A latitude of modification, change, and substitution is intended in the foregoing disclosure and in some instances, some features of the invention will be employed without a corresponding use of the other features. Accordingly, it is appropriate that the appended claims be construed broadly and in a manner consistent with the scope of the invention.

I claim:

1. A computerized method, encoded on a computer-readable medium and executable on a computing device, of detecting anomalies in a data stream, the method comprising:

(a) in an off-line process, using a tree structure comprising a suffix tree having suffixes representing certain patterns of interest which have an associated length to extract a grammar from a sample of normal behavior, the grammar having an associated set of rules;

(b) in a subsequent on-line process, checking the data stream against the rules of the grammar to detect deviations; and (c) generating an alarm indication when a deviation is detected.

2. The method of claim 1 wherein the sample of normal behavior is extracted more quickly by imposing an upper limit on the length of the patterns of interest and then inserting a prefix of a representing suffix not exceeding the number of patterns of interest into the pattern tree wherein the suffix tree is created by:

(a) selecting a maximum pattern length equal to the sum of a maximum preamble representing a portion of the data stream which precedes a repetition and twice a maximum length of the repetition;

(b) after the suffix tree under the maximum pattern length is created, constructing an auxiliary grammar; and (c) using the auxiliary grammar to filter the sample of normal behavior such that unnecessary rules are eliminated.

3. The method of claim 1 wherein suffixes are truncated before being inserted in the suffix tree.

4. The method of claim 1 wherein a rule-matching automaton is used to detect anomalies.

5. The method of claim 1 wherein the rule-matching automaton is used to take a second pass over the sample in order to reduce the set of rules.

6. The method of claim 5 wherein an upper limit is imposed on the length of the patterns of interest in order to shorten the time required to create a suffix tree of the sample.

7. The method of claim 2 further comprising the step of performing repetition-compaction for identifying repetitions in said data stream and compacting the repetitions found, wherein said auxiliary grammar is constructed to account for said repetitions of event sequences in the rules.

8. A computerized method, encoded on a computer-readable medium executable on a computing device, of detecting anomalies in a data steam, the method comprising:

(a) in an off-line process, extracting a grammar from a sample of normal behavior, the grammar having an associated set of rules;

(b) in a subsequent on-line process, checking the data stream against the rules of the grammar to detect anomalies and generating an alarm indication when a data stream anomaly is detected; and (c) using a rule-matching automaton to take a second pass over the sample in order to reduce the set of rules, for application in subsequent processes.

* * * * *